(12) United States Patent
Rama

(10) Patent No.: US 10,209,967 B2
(45) Date of Patent: Feb. 19, 2019

(54) SYSTEM AND METHOD FOR DETECTING PREVENTATIVE MAINTENANCE OPERATIONS IN COMPUTER SOURCE CODE

(75) Inventor: Girish Maskeri Rama, Bangalore (IN)

(73) Assignee: Infosys Technologies Ltd., Bangalore (IN)

( * ) Notice: Subject to any disclaimer, the term of this patent is extended or adjusted under 35 U.S.C. 154(b) by 265 days.

(21) Appl. No.: 13/027,950

(22) Filed: Feb. 15, 2011

(65) Prior Publication Data
US 2012/0096434 A1 Apr. 19, 2012

(30) Foreign Application Priority Data
Oct. 18, 2010 (IN) .......................... 3055/CHE/2010

(51) Int. Cl.
| | |
|---|---|
| G06F 9/44 | (2018.01) |
| G06F 8/36 | (2018.01) |
| G06F 8/70 | (2018.01) |
| G06F 8/72 | (2018.01) |

(52) U.S. Cl.
CPC ................. *G06F 8/36* (2013.01); *G06F 8/70* (2013.01); *G06F 8/72* (2013.01)

(58) Field of Classification Search
CPC .............................................. G06F 8/00–8/77
USPC ....................................................... 717/120
See application file for complete search history.

(56) References Cited

U.S. PATENT DOCUMENTS

| | | | |
|---|---|---|---|
| 4,835,372 A | 5/1989 | Gombrich et al. | |
| 5,734,837 A | 3/1998 | Flores et al. | |
| 5,774,661 A | 6/1998 | Chatterjee et al. | |
| 5,826,239 A | 10/1998 | Du et al. | |
| 5,937,388 A | 8/1999 | Davis et al. | |
| 6,125,390 A | 9/2000 | Touboul | |

(Continued)

OTHER PUBLICATIONS

Sara Stoecklin, "Support—Refactoring to Good Code—FSU Computer Science", www.cs.fsu.edu/~stoeckli/COURSES/CENSWE2/Support/Refactoring.ppt, Published Apr. 4, 2010, Retrieved Apr. 6, 2017, Slides 1-9 & 99-120.*

(Continued)

*Primary Examiner* — Chameli Das
*Assistant Examiner* — Joanne G Macasiano
(74) *Attorney, Agent, or Firm* — LeClairRyan PLLC

(57) ABSTRACT

The invention relates to a system and method for identifying occurrences of preventive maintenance on computer source code. The method comprises analyzing source code, defining data sets associated with characteristics of the source code, and applying an operation algorithm to the data sets to thereby identify occurrences of preventive maintenance operations that were carried out on the source code. A first instance of a source code and a second instance of the source code are preferably analyzed, wherein the second instance of the source code is a revised version of the first instance of the source code, a first data set associated with the first instance of the source code and a second data set associated with the second instance of the source code are preferably defined, and the operation algorithm is preferably applied to the first data set and the second data set to thereby identify at least one occurrence of a preventive maintenance operation that was carried out on the source code.

36 Claims, 4 Drawing Sheets

(56) References Cited

U.S. PATENT DOCUMENTS

| | | |
|---|---|---|
| 6,393,290 B1 | 5/2002 | Ufongene |
| 6,473,794 B1 | 10/2002 | Guheen et al. |
| 6,698,013 B1* | 2/2004 | Bertero et al. ............... 717/127 |
| 6,714,976 B1 | 3/2004 | Wilson et al. |
| 6,988,088 B1 | 1/2006 | Miikkulainen et al. |
| 7,328,261 B2 | 2/2008 | Husain et al. |
| 7,364,067 B2 | 4/2008 | Steusloff et al. |
| 7,509,343 B1 | 3/2009 | Washburn et al. |
| 7,587,715 B1 | 9/2009 | Barrett et al. |
| 7,613,804 B2 | 11/2009 | Raden et al. |
| 7,707,133 B2 | 4/2010 | Das et al. |
| 2002/0055849 A1 | 5/2002 | Georgakopoulos et al. |
| 2002/0059456 A1 | 5/2002 | Ha et al. |
| 2002/0078174 A1 | 6/2002 | Sim et al. |
| 2002/0133491 A1 | 9/2002 | Sim et al. |
| 2002/0170052 A1* | 11/2002 | Radatti ........................ 717/171 |
| 2002/0199173 A1* | 12/2002 | Bowen ......................... 717/129 |
| 2003/0229890 A1 | 12/2003 | Lau et al. |
| 2004/0205182 A1 | 10/2004 | Geddes |
| 2005/0010880 A1 | 1/2005 | Schbert et al. |
| 2005/0060224 A1 | 3/2005 | Ricketts |
| 2005/0091269 A1 | 4/2005 | Gerber et al. |
| 2005/0216486 A1* | 9/2005 | Barshefsky et al. .......... 707/100 |
| 2005/0278202 A1 | 12/2005 | Broomhall et al. |
| 2006/0004767 A1 | 1/2006 | Diaconu et al. |
| 2006/0067252 A1 | 3/2006 | John et al. |
| 2006/0112375 A1 | 5/2006 | Schneider |
| 2006/0287890 A1 | 12/2006 | Stead et al. |
| 2007/0157183 A1* | 7/2007 | Pazel ..................... G06F 8/425 717/141 |
| 2007/0168225 A1 | 7/2007 | Haider et al. |
| 2007/0282659 A1 | 12/2007 | Bailey et al. |
| 2010/0169875 A1* | 7/2010 | Stewart ........................ 717/170 |
| 2011/0283270 A1* | 11/2011 | Gass et al. ................... 717/168 |
| 2011/0314449 A1* | 12/2011 | Babu et al. ................... 717/120 |

OTHER PUBLICATIONS

P. Weissgerber and S. Diehl, "Identifying Refactorings from Source-Code Changes," 21st IEEE/ACM International Conference on Automated Software Engineering (ASE'06), Tokyo, 2006, pp. 231-240.*

Godfrey, Michael W., and Lijie Zou. "Using origin analysis to detect merging and splitting of source code entities." IEEE Transactions on Software Engineering 31.2. p. 166-181. (Year: 2005).*

Antoniol, Giuliano, Massimiliano Di Penta, and Ettore Merlo. "An automatic approach to identify class evolution discontinuities." null. IEEE. (Year: 2004).*

* cited by examiner

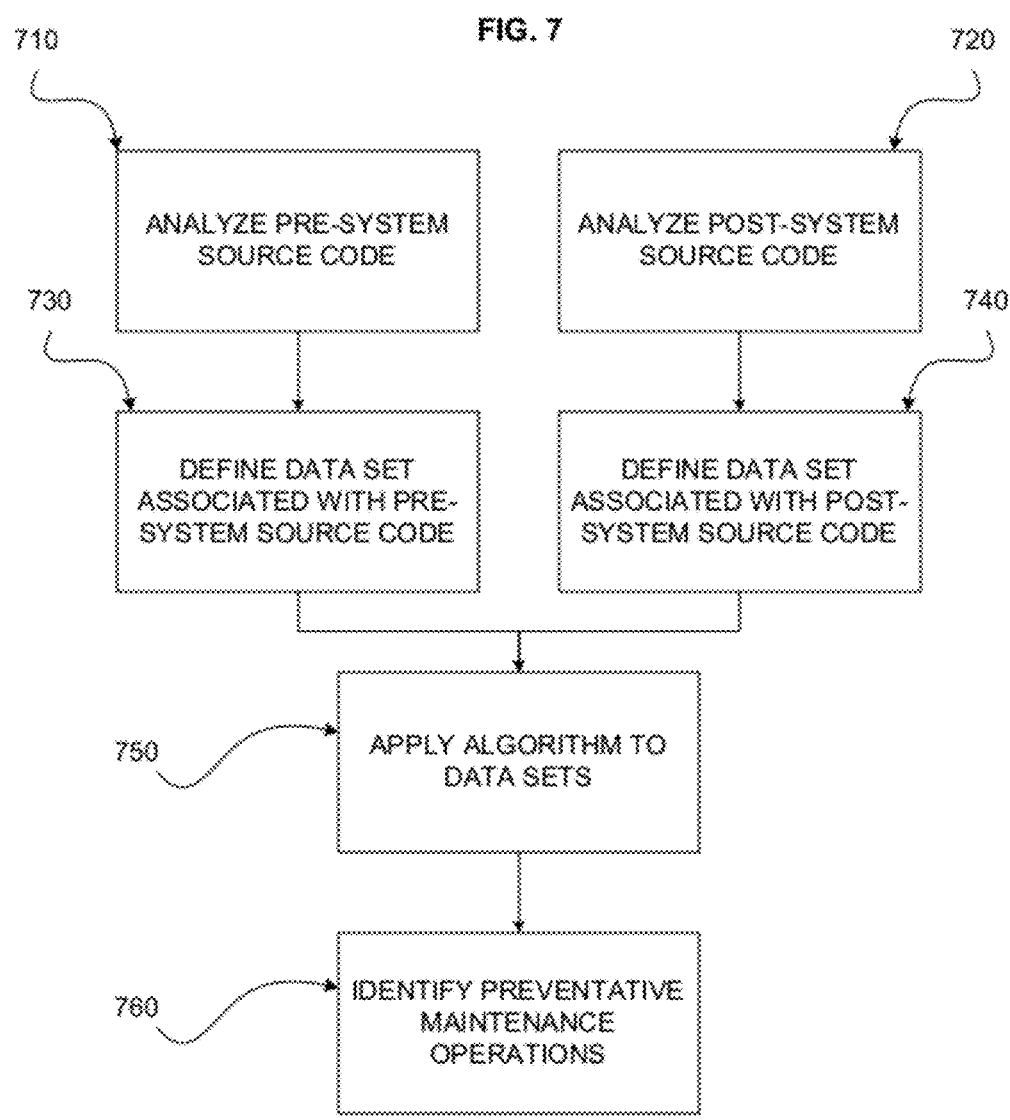

SYSTEM AND METHOD FOR DETECTING PREVENTATIVE MAINTENANCE OPERATIONS IN COMPUTER SOURCE CODE

This application claims the benefit of Indian Patent Application No. 3055/CHE/2010, filed Oct. 18, 2010, which is hereby incorporated by reference in its entirety.

FIELD OF THE INVENTION

The invention relates to a system and method for identifying occurrences of preventive maintenance on computer source code.

BACKGROUND OF THE INVENTION

Typical software maintenance carried by the service companies mainly involves corrective and adaptive maintenance (as defined in ISO/IEC 14764) usually in a T&M model. The differentiation offered to clients is in terms of pricing, experience and expertise of the maintainers, and the internal process and tools adopted for maintenance. Metrics based on prior maintenance history such as average bug fix cycle time, number of additional bugs introduced are also used as an indicator of the maintenance capability. While these parameters are necessary they are not sufficient to fully articulate the value offered to the customer.

Software maintenance that is purely focused on corrective and adaptive maintenance runs the risk of deteriorating the structural quality of the software. This phenomenon, referred to in the literature as software ageing, makes software very hard to maintain in the future. It is generally accepted that "preventive maintenance" nullifies the deterioration and improve the future maintainability of the software. "Preventive maintenance" involves activities that improve the structure of the software so that it is more maintainable without modifying the externally observable behavior. Software restructuring and refactoring are the activities that are generally considered to be part of preventive maintenance.

The present technology can help in demonstrating the value of the corrective and adaptive maintenance, but are not an indicator of preventive maintenance. Moreover, because of the maturity of the IT services industry, the differentiation between the various companies in terms of these parameters has come down. Lastly, a major limitation is that since the present technology does not quantify the amount of preventive maintenance done, they are not good indicators of long term software maintenance quality.

Recently, software ageing and the problem of software maintenance has received much attention and preventive maintenance is increasingly being considered as a key component of software maintenance. However, there does not exist any technology for quantitatively showing the amount of preventive maintenance carried out.

One of the key enablers for preventive maintenance is software modularization, which improves the maintainability of software systems. Software modularization is the restructuring of the software system as a set of modules with well defined APIs, adhering to a set of modularity principles.

Software modularization has been an active area of research and number of approaches have been published in literature on modularizing software systems. Most of these approaches deal with automated approaches for splitting a monolithic code base by grouping logically related files into modules. For solving this problem, a number of approaches have been tried out in literature. These include techniques based on software clustering, graph partitioning, concept analysis, program analysis, meta-heuristic search based optimization, information theoretic, and association rule mining. However, as indicated recently by Maqbool and Babri (Maqbool and H. A. Babri, "Hierarchical clustering for software architecture recovery," IEEE Transactions on Software Engineering, vol. 33, no. 11, pp. 759-780, 2007.), completely automated software modularization is still very much an unsolved problem.

While discussing the problem of software modularization, Rama argues that the modularization needs of all system are not the same and categorizes systems into three main categories. (G. Maskeri Rama, "A Desiderata for Refactoring-Based Software Modularity Improvement," in India Software Engineering Conference, ISEC 2010, February 2010.). Monolithic Systems that have no modular structure at all belong to the first category. The primary need of these systems, addressed predominantly by the existing work mentioned above, is the automated support for decomposing the monolithic code into modules. Systems that were initially designed in a modular fashion but having degraded over years of maintenance, still have some degree of modular structure belong to the second category. The primary need of these systems is the incremental improvement in modularity in some modules along with module decomposition. Lastly, newer systems that are starting to show signs of degradation are classified as belonging to the third category. These systems rarely have the need to split monolithic code into modules and more often the requirement is to improve the modularity without drastic change to the existing modular structure. The above work, however, does not mention what specific activities can be used to improve the modularity or the most common recurring activities during modularization of typical systems.

The concept of modularity and modularity operators are discussed in the work of Baldwin and Clark on the economic theory of modularity. (C. Baldwin and K. Clark, Design Rules vol. 1: The Power of Modularity. Cambridge, Mass.: MIT Press, 2000.). Baldwin and Clark examine the impact of the modular approach on the design process of computer systems generally from an economic perspective. Using options theory, Baldwin and Clark model the economic value of modularization, and formalize the evolution of modular systems as the actions of six modular operators:

Splitting: Splitting a module into several smaller modules.

Substitution: Substituting one module by an functionally equivalent module. This allows "competition" between multiple versions of a given module.

Augmentation: Adding a new module to an existing modular system.

Exclusion: Removing a module from an existing modular system.

Inversion: Taking low-level but much-replicated functions and moving them up the module hierarchy, thus increasing their visibility.

Porting: Removing the dependence of modules on a given external system, and adding proxy modules.

While there exists an intuitive understanding of the common activities that are carried out during modularization, such as the work by Baldwin et al., they are not formally and unambiguously defined. As a result, it cannot be automatically determined from the source code whether any structural improvement has been done or not.

SUMMARY OF THE INVENTION

As described herein, there are a few commonly recurring primitive software structural improvement activities that are likely to be the basic building blocks of any preventive maintenance carried out. Following the terminology used by Baldwin et al., these activities are referred to as preventive maintenance operators herein. Once a formal definition of these operators is in place, the novel methods of the invention can be used to mine the instances of these preventive maintenance operators in the source code, and identify the preventive maintenance operations carried out.

While corrective maintenance and adaptive maintenance continues to be the key activities in traditional software maintenance, they are slowly becoming a commodity. Consequently, maintenance service providers are looking at differentiating their service through additional preventive maintenance done as part of regular maintenance. However, a key problem is in quantifying the amount of preventive maintenance done and articulating the additional value provided to the customers. An important pre-requisite for this is to identify the specific type and number of activities considered as contributing to preventive maintenance among the numerous activities performed during maintenance. The invention provides a method and tool for detecting and recognizing such preventive maintenance activities.

In particular, one aspect of the invention relates to a method for identifying occurrences of preventive maintenance on computer source code. This method is preferably carried out by first analyzing a first instance of a source code and a second instance of the source code, wherein the second instance of the source code is a revised version of the first instance of the source code. Then, a first data set associated with at least one characteristic of the first instance of the source code and a second data set associated with at least one characteristic of the second instance of the source code are defined. Finally, an operation algorithm is applied to the first data set and the second data set to thereby identify at least one occurrence of a preventive maintenance operation that was carried out on the source code. These steps are preferably carried out by computing devices.

The above method can be used in conjunction with any number of operation algorithms, and the specific actions taken will vary depending on the operation algorithm used.

For example, in one embodiment, the step of analyzing comprises selecting a file that exists within a module in the first instance of the source code and within a module in the second instance of the source code, the first data set comprises a first neighboring set of files for the selected file, the first neighboring set of files including the selected file and all other files located within the module in the first instance of the source code, and the second data set comprises a second neighboring set of files for the selected file, the second neighboring set of files including the selected file and all other files located within the module in the second instance of the source code.

Using this method, at least one of the identified occurrences of preventive maintenance operations is a module decomposition operation if the intersection of the first neighboring set of files and the second neighboring set of files is the same as the second neighboring set of files. Similarly, at least one of the identified occurrences of preventive maintenance operations is a module union operation if the intersection of the first neighboring set of files and the second neighboring set of files is the same as the first neighboring set of files. Furthermore, at least one of the identified occurrences of preventive maintenance operations is a transferral operation if the intersection of the first neighboring set of files and the second neighboring set of files is smaller than either the first neighboring set of files or the second neighboring set of files.

In another embodiment, the first data set comprises a first set of API files comprising the API files included in the first instance of the source code, and the second data set comprises a second set of API files comprising the API files included in the second instance of the source code. Using this method, at least one of the identified occurrences of preventive maintenance operations is a promote function to API operation if the second set of API files includes at least one declared function that was not included in the first set of API files.

In a further embodiment, the step of analyzing comprises selecting a file that exists within a module in the first instance of the source code and within a module in the second instance of the source code, the first data set comprises a first set of functions associated with the selected file, wherein the first set of functions includes the functions associated with the selected file located within the module in the first instance of the source code, and the second data set comprises a second set of functions associated with the selected file, wherein the second set of functions includes the functions associated with the selected file located within the module in the second instance of the source code. Using this method, at least one of the identified occurrences of preventive maintenance operations is a function transferral operation if the second set of functions is different from the first set of functions.

In yet another embodiment, the step of analyzing comprises selecting a file that exists within a module in the first instance of the source code and within a module in the second instance of the source code, the first data set comprises a first set of data structures associated with the selected file, wherein the first set of data structures includes the data structures associated with the selected file located within the module in the first instance of the source code, and the second data set comprises a second set of data structures associated with the selected file, wherein the second set of data structures includes the data structures associated with the selected file located within the module in the second instance of the source code. Using this method, at least one of the identified occurrences of preventive maintenance operations is a data structure transferral operation if the second set of data structures is different from the first set of data structures.

The invention can further include reporting the identified occurrences of preventive maintenance operations that were carried out on the source code to a consumer. Furthermore, a pricing model can be determined for the software based on the identified occurrences of the preventive maintenance operations.

The methods of the invention can be utilized in a system for identifying occurrences of preventive maintenance on computer source code. Specifically, one or more computing devices can be programmed to carry out the steps of the method. For example, the system may comprise a computing device programmed to analyze a first instance of a source code, a computing device programmed to analyze a second instance of the source code, wherein the second instance of the source code is a revised version of the first instance of the source code, a computing device programmed to define a first data set associated with at least one characteristic of the first instance of the source code, a computing device programmed to define a second data set associated with at least one characteristic of the second instance of the source code, and a computing device programmed to apply an operation algorithm to the first data set and the second data set to thereby identify at least one occurrence of a preventive maintenance operation that was carried out on the source code.

The methods of the invention can also be embodied in a non-transitory computer-readable storage medium. This medium preferably has instructions recorded thereon for identifying occurrences of preventive maintenance on computer source code, which, when the instructions are executed by a processor, cause the processor to carry out the steps of the method.

BRIEF DESCRIPTION OF THE DRAWINGS

FIG. 7 is a flowchart illustrating an exemplary method of the invention.

DETAILED DESCRIPTION OF THE INVENTION

Figure 1:
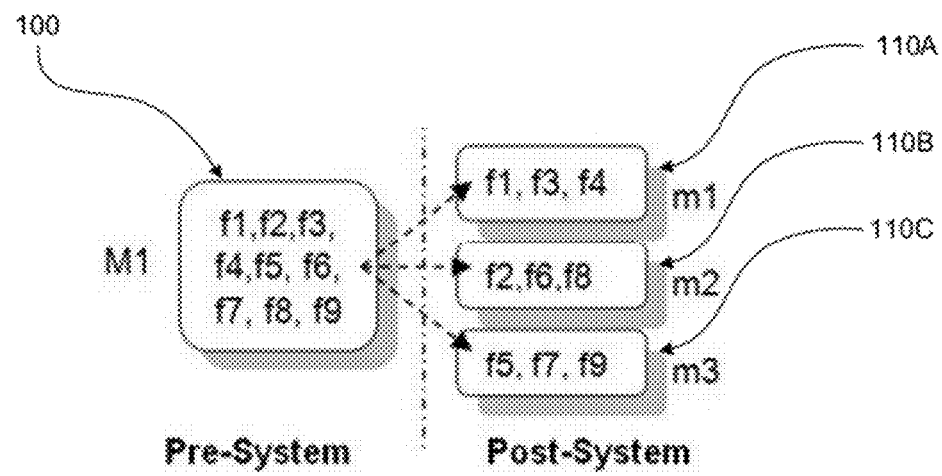
FIG. 1 illustrates exemplary Pre-System and Post-System modules after a Module Decomposition Operator is applied.

As described above, the invention describes a method for identifying occurrences of preventive maintenance on computer source code. Specifically, the method is preferably used to analyze a first instance of a source code (referred to interchangeably as Pre-System herein) and a second instance of the source code (referred to interchangeably as Post-System herein), define data sets based on the analysis, and apply operation algorithms to the data sets to thereby identify occurrences of preventive maintenance operations that were carried out on the source code. The Post-System source code is a revised version of the Pre-System source code, which can be the result of any action taken on the Pre-System source code that alters the source code in any way. As described herein, the revisions to the source code are typically the result of the application of one or more preventative maintenance operators, which are described in detail below.

Preventive Maintenance Operators

The following preventive maintenance operators are the most common preventative maintenance operators used on computer source code. As such, they are discussed in detail herein to exemplify the utility of the invention. Each of the operators set forth below perform an action on an initial version of the source code or software and change the structure in a way that alters, and presumably improves, its modularity. This initial version of the source code (i.e. Pre-System) is the state of the computer source code prior to the application of the preventive maintenance operator. After the preventive maintenance operator has performed its action on the source code, the source code is Post-System.

Let the pre version of the software system be denoted by the symbol $S_{pre}$, and let the post version of the software system be denoted by the symbol $S_{post}$.

Let $S_{pre}$ consist of $F_{pre}$ files distributed over $M_{pre}$ modules. Similarly, let $S_{post}$ consist of $F_{post}$ files distributed over $M_{post}$ modules.

Let $F=\{f_1, f_2, \ldots, f_{F_l}\}$ be the set of files common to both $S_{pre}$ and $S_{post}$, i.e $F \subset F_{pre} \wedge F \subset F_{post}$ Let $module_{pre}(f): F \Rightarrow M_{pre}$ be a function that maps a given file from the set F to the containing module in the pre version of the software $S_{pre}$.

Similarly, let $module_{post}(f): F \Rightarrow M_{post}$ be a function that maps a given file to the containing module in the post version of the software $S_{post}$.

Let $P_{pre}$ be the set of functions (procedures) in $S_{pre}$ distributed over $F_{pre}$ files. Similarly, Let $P_{post}$ be the set of functions (procedures) in $S_{post}$ distributed over $F_{post}$ files.

Let P be the set of function definitions common in both the pre and post versions of the system. i.e $P \subset P_{pre} \wedge P \subset P_{post}$ Let $file_{pre}(p): P \Rightarrow F_{pre}$ be a function that maps a given procedure from the set P to the containing file in the pre version of the software $S_{pre}$.

Similarly, let $file_{post}(p): P \Rightarrow F_{pre}$ be a function that maps a given procedure to the containing file in the post version of the software $S_{post}$.

Let $D_{pre}$ be the set of data structures in $S_{pre}$ distributed over $F_{pre}$ files. Similarly. Let $D_{post}$ be the set of data-structures in $S_{post}$ distributed over $F_{post}$ files.

Let D be the set of data structures common in both the pre and post versions of the system. i.e $D \subset D_{pre} \wedge D \subset D_{post}$ Let $file_{pre}(d): D \Rightarrow F_{pre}$ be a function that maps a given datastructure from the set D to the containing the in the pre version of the software $S_{pre}$.

Similarly, let $file_{post}(d): D \Rightarrow F_{post}$ be a function that maps a given data structure to the containing file in the post version of the software $S_{port}$.

Module Decomposition Operator

Module decomposition is one of the most important, and most common, operators in the software architects toolkit. Module decomposition is an operator which operates on a large monolithic module and creates a new smaller module from a cohesive subset of files from the larger module. A monolithic large module is a module that can consists of a large number of files (for example, hundreds or sometimes even thousands) in a single directory. This operator can be specified as follows:

---

Algorithm 1
Module Decomposition

Require: $m \in M_{pre} \wedge \{f \in F \mid module_{pre}(f) = m\}$
Ensure: $m' \in M_{post}$
Ensure: $\forall f \in F(module_{post}(f) = m' \rightarrow module_{pre}(f) = m)$

---

FIG. 1 illustrates how the Module Decomposition Operator can repeatedly applied (in this case three times) to split a module 100 into several smaller more maintainable modules 110A-C. As shown in FIG. 1, Pre-System refers to the initial system and Post-System refers to the system after the Module Decomposition Operator has been applied three times. Pre-System includes a monolithic module M1 (100), which is divided into three modules m1 (110A), m2 (110B), or m3 (110C) in Post-System. Module M1 (100) is significantly larger than any of modules m1 (110A), m2 (110B), or m3 (110C). In this scenario, smaller modules m1 (110A), m2 (110B), and m3 (110C) can also be combined to re-form module M1 (100).

This operator is usually applied in the context of large monolithic modules. Generally such modules would have grown in size over time and would be offering diverse functionality to its clients. The Module Decomposition Operator can be advantageously used for the following reasons:

Functional re-design: Re-design of the functionality of the module in number of cases forced a new module structure. For example, in Mozilla, when a generic front-end was developed number of header files from the module cmd/winfe/ that were still specific to a platform were moved into their own new modules. Similarly, when the licensing of some of the files in the RDF modules modules/rdf/src/ were changed to Open Directory License they were forced to create a new module and move these files there for ease of maintenance.

Monolithic module: Modules that are monolithic and/or difficult to maintain can be decomposed into smaller module. This is especially true of systems in which all the files were initially distributed over top level directories. In this scenario, it is advantageous for developers to iteratively decompose the top level directories into submodules forming a tree structure. For a similar reason, in Mozilla, modules lib/libnet and lib/plugin were decomposed into number of smaller modules.

Increase in module complexity: In some cases, addition of new files reduces the cohesion in the module. Developers in such cases identify sub-set of files in the module that are cohesive and create a new module. For example, in Linux, addition of number of new files rendered the modules arch/arm/plat-omap and arch/avr32/mach-at32ap less, cohesive and they had to be appropriately split into smaller modules.

In addition, the Module Decomposition Operator can be advantageously applied when a module starts exhibiting one or more of the following symptoms:

1) The module has too many diverse clients. A change in the module to support one client forces other unrelated clients to be compiled and tested as well.

2) It is difficult to perform impact analysis and test a specific functionality offered by the module.

3) It is harder to maintain as it is usually associated with many interest or focus of concern.

4) Issues of low reusability of the module.

5) Harder to add new functionality in the module or program itself.

An example of module decomposition is the decomposition of the module libnet in Mozilla. Libnet is a high-level API (toolkit) that allows the application programmer to construct and inject network packets. The libnet module was large in size with more than 98 files. In order to create a maintainable and modular architecture, the developers split the libnet into 17 smaller modules. Each creation of these smaller modules is an instantiation of the decomposition operator. In this example, there would be 17 instantiations of the Module Decomposition Operator.

Module Union Operator

The converse of the Module Decomposition Operator is the Module Union Operator. This operator can be specified as follows:

Algorithm 2
Module Union

Figure 2:
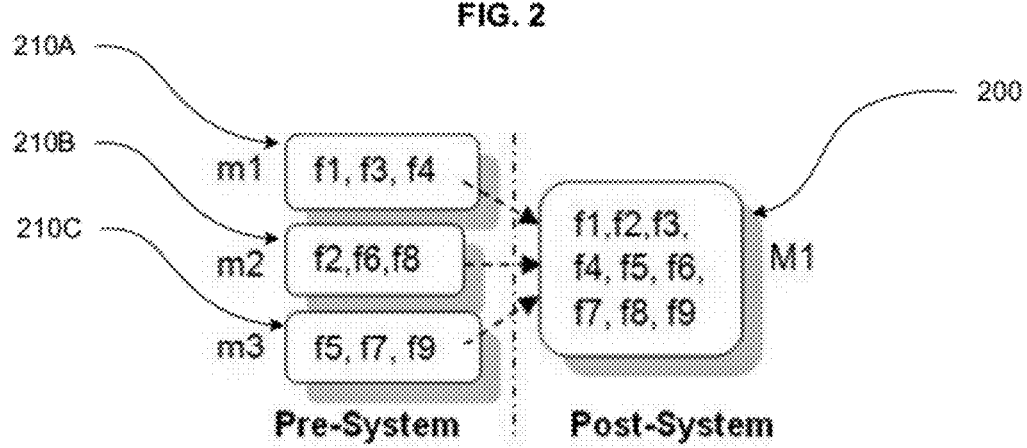
FIG. 2 illustrates exemplary Pre-System and Post-System modules after a Module Union Operator is applied.

Require: $m \in M_{pre} \wedge \{f \in F \mid module_{pre}(f) = m\}$
Ensure: $m' \in M_{post}$
Ensure: $\forall f \in F(module_{pre}(f) = m \rightarrow module_{post}(f) = m')$ FIG. 2 depicts the scenario where modules m1 (210A), m2 (210B), or m3 (210C) in the Pre-System are being combined into a much bigger module M1 (200) in the Post-System. While module decomposition was concerned with large modules offering diverse functionality, module union addresses the converse situation where related functionalities are implemented across multiple modules. Generally, in such cases individual modules are too small to provide a cohesive unit functionality and are heavily dependent on other modules. Subsequently, changes are not localized within module. So for ease of maintenance, developers merge such smaller logically related modules into a larger module.

The Module Union Operator can advantageously be used for the following reasons:

Specific to generic: A common scenario is where instead of having multiple specific implementations for various clients the code is redesigned to have a single generic implementation. For instance in case of linux when the OS-dependent acpi support was redesigned to OS-independent acpica support modules supporting specific platforms were merged into the module drivers/acpi/acpica after filtering out the files that were completely OS specific.

Module similarity: Another common pattern in the module unions was the need to combine similar modules for ease of understanding and maintenance. For instance developers in linux 26 had separate modules for sparc and sparc64. In linux 30 they combined it together to form the modules arch/sparc/mm/, arch/sparc/kernel/, arch/sparc/prom/ and arch/sparc/lib/.

Interface redesign: In some cases, the module union instances can be structural in nature. For example, in Mozilla, modules with only header files have been merged together into the module include/.

An example of the Module Union Operator is the drivers/acpi/* folders in Linux, which provides drivers for Advanced Configuration and Power Interface Specification. The developers initially had operating system (OS) dependent acpi drivers that were organized in multiple directories corresponding to the various OS. The ACPI specification was overly complex and it was difficult to implement the specification for each individual OS. So the developers came up with ACPI Component Architecture, with an aim to simplify ACPI implementations for operating system vendors (OSVs) by providing major portions of an ACPI implementation in OS-independent ACPI modules that can be easily integrated into any OS. As part of this change, number of original acpi modules were modified and consolidated together under a common directory acpica.

File Transferral Operator

A module is considered to be cohesive if files in the module are logically related to each other and have similarity of purpose or share a common goal. However, as the system evolves the cohesiveness between the files in a module may reduce and it would be more logical to place a file in another module. The File Transferral Operator works in a direction to increase the cohesiveness of a file by moving it into a more appropriate module. The File Transferral Operator can be specified as follows:

---
Algorithm 3
File Transferral
---
Require: f ∈ F
Ensure: $module_{pre}(f) \neq module_{post}(f)$

---

Figure 3:
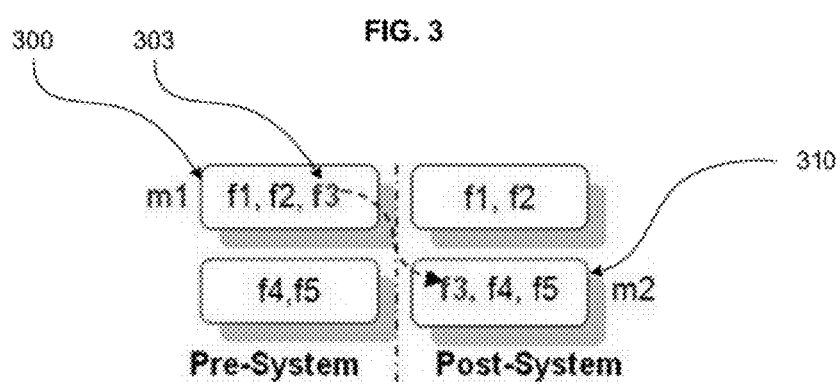
FIG. 3 illustrates exemplary Pre-System and Post-System modules after a File Transferral Operator is applied.

FIG. 3 depicts the File Transferral Operator where a file f3 (303) in module m1 (300) is transferred to another module m2 (310). A common scenario where the File Transferral Operator is applicable is when a new file is wrongly placed in a module which either uses this new file or provides services to this new file, instead of its logical module. Additional reasons for using the File Transferral Operator include the following:

Increased external usage: This operator may be applied when a given file which was traditionally only used internally within the module, because of its generality, started to get used by files in other modules. For instance, in Linux, the file map_to_7segment.h was moved from the module drivers/input/misc/ to the module include/linux/

New feature addition: When developers add several new files to a module to support a new functionality for various platforms, the cohesiveness of the files in the modules is reduced. So the developers may categorize the files into logical groupings, create new modules and transferred relevant files from the original module to the newly created modules. For instance, in Linux, developers created a new module drivers/misc/eeprom/ and transferred files eeprom_93cx6.c and at 25.c related to eeprom from modules drivers/misc/ and drivers/spi/ respectively to the module drivers/misc/eeprom/. Similarly driver files corresponding to various vendors such as Toshiba and Asus for the x86 platform were moved from module drivers/acpi/ to the newly created module drivers/platform/x86/.

Misfit file: Files may also be transferred from a module, where the file is not cohesive with the rest of the files in that module, to a different more closely related module. For instance, the file dma-noncoherent.c in the module arch/powerpc/lib was redesigned to use the vmalloc function. Now, this file was logically closer to the memory management module and hence transferred to arch/powerpc/mm/.

Code cleanup: Sometimes even some code clean up results in the need for file transferral. For instance, the file sra_32.c in module arch/x86/kernel/ relating to memory management may be called before another file. When the developers refactor the code so as to directly call the other file, the former file related to the memory management may be moved to the arch/x86/mm/ module.

Increased usage: In some other cases, files are transferred from sub-modules to the parent module. For instance, in Mozilla, a file pprmwait.h in nsprpub/pr/src/io/ was used by one other submodule under the parent module nsprpub/pr. In order to avoid this unwanted dependency between the sub-modules, the file was transferred to nsprpub/pr/include/private/ which is the common location for files that are used among the sub-modules.

An example of the File Transferral Operator are the files menelaus.c and tps65010.c in module drivers/i2c/chips/ from Linux. These files initially dealt with chip related functionality but later acted more like multi-functional devices. Thus, they were transferred to the module drivers/mfd/.

Function Transferral Operator

In systems that have a reasonably good modular structure, maintainers turn their focus on individual files. If some function in the file is not cohesive with the rest of the functions in the file maintainers transfer it to another file where it is more closely related to. This operator is especially applied during preventive maintenance to maintain or even improve the structure of the system. This operator can be specified as follows:

---
Algorithm 4
Function Transferral
---
Require: p ∈ P
Ensure: $file_{pre}(p) \neq file_{post}(p)$

---

Figure 4:
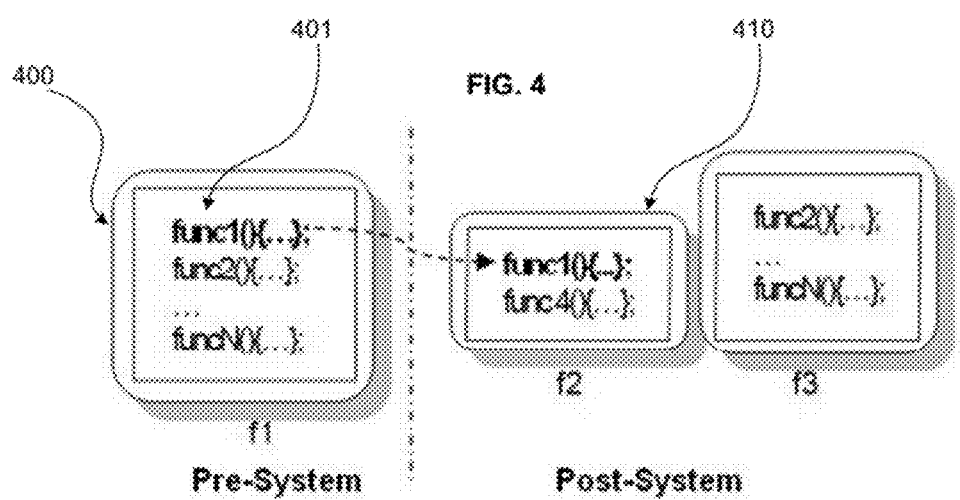
FIG. 4 illustrates exemplary Pre-System and Post-System files after a Function Transferral Operator is applied.

FIG. 4 depicts the scenario where a function func1( ) is transferred from file f1 to a different file f2. As illustrated in the figure the destination file can be altogether in a different module. For an example of the application of the Function Transferral Operator, consider the file ht.c in Mozilla which depends on the file core.c. One of the functions compareStrings( ) in the file ht.c, as can be guessed from its name, is a utility function and not directly related to the functionality offered by this file. When a function in the file core.c started to call this utility function, it created an unwanted circular dependency between core.c and ht.c.

Ideally utility functions such as this one should be placed in a utilities file. This is exactly what the Mozilla maintainers did. They transferred the function compareStrings( ) from the file ht.c to the file utils.c. The dependency of core.c on ht.c was broken and instead both of these files now depended on utils.c.

Possible reasons for utilizing the function transferral operator include the following:

Low cohesion: Function may be transferred to increase the cohesiveness of a file. For instance consider the transfer of function EmitNumberOp( ) from the file jsparse.c to file jsemit.c in Mozilla. In the pre-version of the system, this function made one call to a another function in jsemit.c and three calls to functions in file jsatom.c. As name of the function suggests, this function sets the number operand, but it has been placed in jsparse.c where it is less cohesive with the rest of the files. In the post-version of the system, this function was updated to use another additional function in file jsemit.c. The developers during this modification, realized that the function EmitNumberOp( ) logically belongs to the file jsemit.c and transferred it.

Change in function calling pattern: In few cases, changes to the function calling pattern triggered the transferral of the function from one file to another. For instance, consider the function MakeRDFBURL( ) in file nlcstore.c in Mozilla. Initially, this function was called from another function within the file. When this file was modified, the call to the function MakeRDFBURL( ) was deleted. Moreover, calls to this function were added from other files remstore.c and strlen.c. Since, the function MakeRDFBURL( ) is not a key functionality provided by nlcstore.c, the new calls to this function created an unwanted dependency of the files remstore.c and strlen.c on nlcstore.c. Also, this function now acted like a utility function to other files. So the developers transferred this function to utils.c which is a collection of all utilities functions related to RDF.

Promote Function to API Operator

As a system evolves, it is likely that the new functionality added, depends on older non API functions that were designed to be used only within the module. For future evolution of that module with minimal effect to the clients it is important to recognize the functions used outside the module. So developers declare such functions in the header file meant to be the interface of the module. This activity is referred to as promoting a function to API herein, and specify this formally as follows.

Let $F_{pre}^{api}$ represent the set of API files in the pre-version of the software system. Similarly. Let $F_{post}^{api}$ represent the set of API files in the post-version of the software system. That is $F_{pre}^{api} \subset F_{pre}$ and $F_{post}^{api} \subset F_{post}$. Let $decl_{pre}(p): P \Rightarrow P(F_{pre})$ and $decl_{post}(P): P \Rightarrow P(F_{post})$ be two functions that map a given function to the set of files which contain the function declaration in the pre-system and post-system respectively.

Now the Promote Function to API Operator can be specified as follows:

---
Algorithm 5
Promote Function to API
---
Require: $p \in P \wedge \forall f \in decl_{pre}(p)(f \notin F_{pre}^{api})$
Ensure: $\exists f \in decl_{post}(p)(f \in F_{post}^{api})$
---

Figure 5:
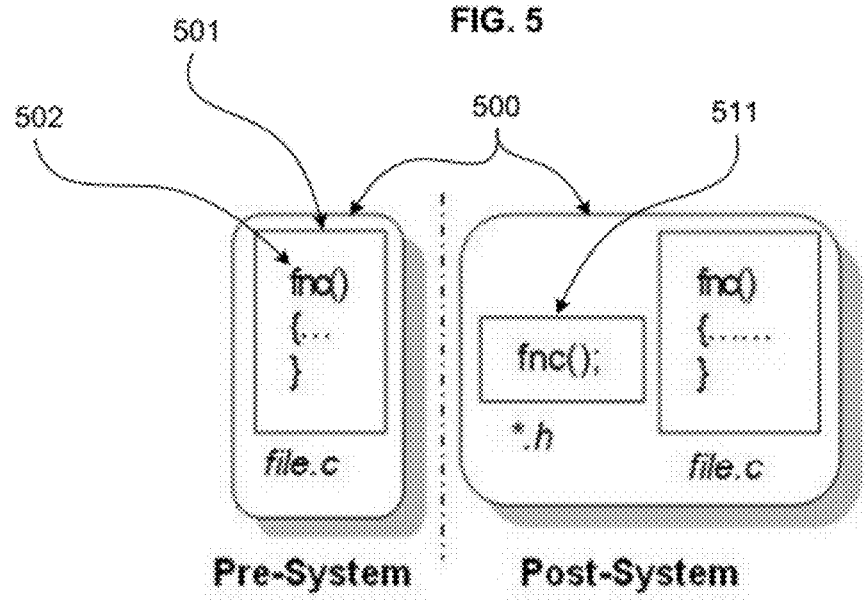
FIG. 5 illustrates exemplary Pre-System and Post-System files after a Promote Function to API Operator is applied.

FIG. 5 shows the application of this operator in the context of a C/C++ system. The function fnc( ) (501) was not declared in the header file interface of the module (500) in the Pre-System. This operator inserts a declaration of function (501) in the header file (511) in the module (500) in the Post-System. This operator may be used in the following situations, for example:

Publication: A function may be promoted to an API function (i.e. by including the function declaration in header files) so that it can be published to other clients.

Use Outside Its File: A function may be promoted to an API function if it begins to be used outside of its own file. For instance consider the function ArcRead( ) in file arch/mtps/fw/arc/file.c in Linux-26. When this function started to get used by other files, a declaration of the function was added to the header file arch/mips/include/asm/sgialib.h. Subsequently, all other files would include this header file for using the ArcRead( ) API function.

For a concrete example of this operator, consider in Linux the function acpi_evaluate_reference( ) which was declared in drivers/acpi/utils.c. When this utility file got used from outside the module, developers elevated its status to an API function and added its declaration in the header file include/acpi/acpi_bus.h.

Data Structure Transferral Operator

It is often the case that when developers add new functionality to existing files they add number of new data structures and related functions. These, however, may not be logically cohesive with the rest of the data structures and functions in the files. In other cases, if the file has become too large, developers find it difficult to maintain and hence create a new file and transfer some of the data structures and related functions to the new file. The Data Structure Transferral Operator transfers a data structure from one file to another. It can be formally specified as follows:

---
Algorithm 6
Data Structure Transferral
---
Require: $d \in D$
Ensure: $file_{pre}(d) \neq file_{post}(d)$
---

Figure 6:
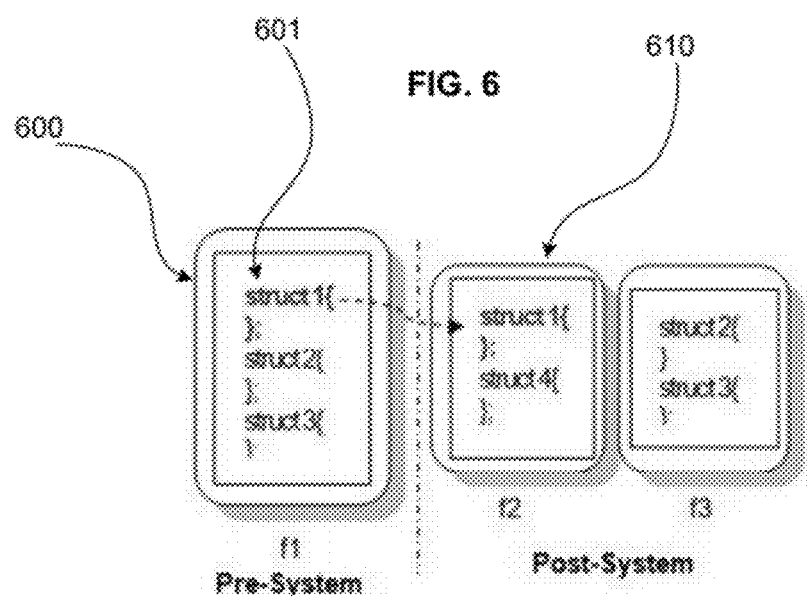
FIG. 6 illustrates exemplary Pre-System and Post-System files after a Data Structure Transferral Operator is applied.

As with function transferral, data structure transferral can transfer a data structure to another file in a different module. For example, FIG. 6 shows a data structure struct1{ } (601) being transferred from Pre-System file f1 (600) to Post-System file f2 (610).

Also, more often than not, the Function Transferral Operator is applied in conjunction with the Data Structure Transferral Operator. As a specific example of this operator consider the data structures bbc_cpu_temp and bbc_fan_control in the file bbc_envctrl.c in Linux 2.6.26.1. According to the developer comments these data structures relate to fans inside the machine and are controlled with an i2c digital to analog converter. So obviously these data structures are more closely related to i2c. So in Linux 2.6.30 developers moved this data structure to the file bbc_i2c.h.

The Data Structure Transferral Operator may be used in the following exemplary situations:

Loss of cohesion due to new functionality: Addition of new functionality in some cases reduces the cohesion in the file. For example, in Linux, the file drm proc.c containing the data structure drm_queue was used to handle the drm. When developers later decided to standardize the interface for drm, they introduced the file drm_info to handle the information of drm. Subsequently, the developers transferred the data structure drm_queue to drm_info as it is the buffer queue for drm and logically belongs to drm_info.

Interface standardization: When certain data structures need to be standardized for use across the system, they are generally transferred from their existing implementation file to a header file interface. For instance, in Linux, the file ndfc.c containing the data structures ndfc_controller_settings and ndfc_chip_settings was playing the role of NanD flash controller. later, when the developers wanted to standardize the interface they created a interface header file nand.h and transferred these data structures to that file.

File deletion: When certain files are deleted, but the data structure contained in the files are still used by other files in the system, those data structures are transferred to another file. For instance, in Linux, the developers decided to remove the files zd_ieee80211.h and zd_ieee80211.c belonging to the USB-WLAN driver module. But the data structures ofdm_plcp_header and cck_plcp_header residing in zd_ieee80211.h were still used by other files. So these were transferred to zd_mach.h which is also part of USB-WLAN driver for Linux.

The invention can also be used to identify other types of preventive maintenance that may be performed on software systems, such as code refactoring. While some forms of preventive maintenance and/or software optimization techniques do not explicitly fall within the above six preventive maintenance operation categories, similar algorithms can be used to detect them, and such algorithms and detection techniques are considered to be within the scope of this invention.

For example, code refactoring can broadly be defined as the process of changing a computer program's source code without modifying its external functional behavior in order to improve some of the nonfunctional attributes of the software. Advantages include improved code readability and reduced complexity to improve the maintainability of the source code, as well as a more expressive internal architecture or object model to improve extensibility. Code refactoring is a key step in preventing software design from becoming overly complex, and can be utilized in most software systems to identify errors and design flaws in code (i.e. code smells), and to modify the source code to improve the quality and efficiency of the software. Common types of code refactoring include Rename Method, Move Class, Extract Method, Pull Up Method, and Push Down Method. An extensive listing of the different types of refactorings and their descriptions can be found at http://www.refactoring-.com/catalog/index.html, for example.

Identifying Preventive Maintenance Operations

Preventive maintenance is not a one shot process but is instead a continuing process. In a number of cases, preventive maintenance activities are carried out along with the other routine maintenance activities such as bug fixes and new feature additions. Consequently, changes done for preventive maintenance are lost among a host of other changes and manually identifying these preventive maintenance changes is infeasible.

According to the invention, novel algorithms can be applied to identify occurrences of preventive maintenance. Specifically, the method of the invention is preferably used to analyze a first instance of a source code (referred to as Pre-System herein) and a second instance of the source code (referred to as Post-System herein), define data sets based on the analysis, and apply novel operation algorithms to the data sets to thereby identify occurrences of preventive maintenance operations that were carried out on the source code.

An overview of the preferred method of the invention is illustrated in FIG. 7. Referring to FIG. 7, the first steps of the method are to analyzing a first instance of a source code (Pre-System)(710) and a second instance of the source code (Post-System)(720). As described above, the second instance of the source code is a revised version of the first instance of the source code. Any suitable computing device can be configured to analyze the source code.

After the instances of the source code are analyzed, a data set is defined based on the analysis of the Pre-System instance of the source code (730). This first data set is associated with at least one characteristic of the first instance of the source code. Similarly, a second data set is defined based on the analysis of the Post-System instance of the source code (740), with the second data set being associated with at least one characteristic of the second instance of the source code. The data sets can include any type of information regarding the source code such as the modules, files, functions, and data structures stored therein, and the relationships between them. Any suitable computing device can be configured to define the data sets.

After the instances of the source code are analyzed and the resulting data sets are defined, an operation algorithm can be applied to the data sets (750). Any suitable computing device can be configured to apply the algorithms. The application of the algorithm results in the identification of at least one occurrence of a preventive maintenance operation that was carried out on the source code (760).

Different operation algorithms are used to detect the different types of preventative maintenance operators. Thus, the specific operation algorithm used in the preferred method is selected based on which preventive maintenance operator is being identified. After the algorithm is selected, it is used to mine the data sets for data that can be used to identify the preventative maintenance operators. Any suitable programming languages can be used to implement the algorithms set forth below, such as Java, Mysql, and the like.

Given that developers tend to rename modules and create new modules during code evolution, the preferred algorithms detect preventive maintenance operators based on the content of the modules and files themselves rather than depending on the names of the modules or files.

To accomplish this, the term "neighbor set," is defined herein. Specifically, for a given file f in a module, the neighbor set is defined as the set of all files in the same module. Let $N_{pre}$ and $N_{post}$ denote the neighbor set for a given file f in the pre version and post version of the system respectively.

The neighbor sets are defined as follows:

$$N_{pre}(f) = \{f_i \in F | \text{module}_{pre}(f_i) = \text{module}_{pre}(f)\}$$

$$N_{post}(f) = \{f_i \in F | \text{module}_{post}(f_i) = \text{module}_{post}(f)\}$$

Detection of Module Decomposition Operators, Module Union Operators, and File Transferral Operators Using these neighbor sets, the algorithms for detecting instances of Module Decomposition Operators, Module Union Operators, and File Transferral Operators can be specified as follows:

---
Algorithm 7
Identifying module decomposition, module union
and file transferral operators

---

Require: variable to store unprocessedFiles $U_p$
1:   $U_p$ = F;
2:   Let $N_{pre}$ and $N_{post}$ be as defined earlier.
3:   while $U_p$ is not empty do
4:       Choose a file f from the set $U_p$
5:       if $N_{pre}(f) \cap N_{post}(f) = N_{post}(f)$ then
6:           Module Decomposition case
7:           remove files $N_{post}(f)$ from $U_p$
8:       else if $N_{pre}(f) \cap N_{post}(f) = N_{pre}(f)$ then
9:           Module Union Case
10:           remove files $N_{pre}(f)$ from $U_p$
11:      else
12:          File Transferral case
13:          remove files in set $N_{pre}(f) \cap N_{post}(f)$ from $U_p$
14:     end if
15: end while

---

This algorithm maintains a set of unprocessed files which is initialized with the files common to both Pre-System and Post-System. During the analysis of the source code, a file f that exists within a module in the first instance of the source code and within a module in the second instance of the source code is selected, preferably at random. The first data set is the defined to include a first neighboring set of files for the selected file f, the first neighboring set of files including the selected file f and all other files located within the module in the Pre-System instance of the source code. Similarly, the second data set is defined to include a second neighboring set of files for the selected file f, the second neighboring set of files including the selected file f and all other files located within the module in the Post-System instance of the source code. After the data sets are defined to include the neighbor sets of the file f, the algorithm identifies which preventative maintenance operators have been used.

Specifically, if the intersection of the first neighboring set of files and the second neighboring set of files is the same as the second neighboring set of files, it can be assumed that the Post-System version of the file f is a subset of its Pre-System version. In particular, the Post-System version of f has been split from the Pre-System version of f. Thus, the algorithm identifies the occurrence of a module decomposition operation. Since, the same results would be obtained for all the other files in the post neighbor set off for optimization, these files are removed from the set of unprocessed files.

For similar reasons, if the intersection of the first neighboring set of files and the second neighboring set of files is the same as the first neighboring set of files, the algorithm identifies the occurrence of a module union operation.

Furthermore, if the intersection of the first neighboring set of files and the second neighboring set of files is smaller than either the first neighboring set of files or the second neighboring set of files, the algorithm identifies the occurrence of a file transferral operation.

Detection of Promote Function to API Operators

The following algorithm can be used to identify instances of the Promote Function to API Operator. Specifically, when using this algorithm, the first data set comprises a first set of API files comprising the API files included in the first instance of the source code, and the second data set comprises a second set of API files comprising the API files included in the second instance of the source code. The algorithm then compares the data sets and identifies functions or files that do not have a declaration in the Pre-System version and iterates over them. If the second set of API files includes at least one declared function that was not included in the first set of API files, the algorithm identifies the occurrence of a promote function to API operation. For example, if a declaration of any of the identified functions is found in a header file in the Post-System, the algorithm identifies it as an instance of the Promote Function to API Operator.

Algorithm 8
Identifying instance of promote function to API operator

```
Require: variable isPreAPI : boolean
Require: variable isPostAPI : boolean
 1:  for p ∈ P do
 2:      isPreAPI = FALSE;
 3:      for f ∈ decl_pre(p) do
 4:          if f ∈ F_pre^api then
 5:              isPreAPI = TRUE;
 6:          else
 7:              continue;
 8:          end if
 9:      end for
10:      if isPreAPI = TRUE then
11:          continue;
12:      else
13:          isPostAPI = FALSE;
14:          for f ∈ decl_post(p) do
15:              if f ∈ F_post^api then
16:                  isPostAPI = TRUE;
17:                  print "Instance of promote function to API operator detected"
18:                  break;
19:              else
20:                  continue;
21:              end if
22:          end for
23:      end if
24:  end for
```

Detection of Function Transferral Operators and Data Structure Transferral Operators The algorithms for detecting instances of function transferal operator and Data Structure Transferral Operators preferably work on expected lines. These algorithms can be easily implemented if databases are used to store meta-data.

When detecting instances of the function transferral operations, the following algorithm can be used.

Algorithm 9
Identifying function transferral operators

```
1:  for p ∈ P do
2:      preFile = file_pre(p);
3:      postFile = file_post(p);
4:      if preFile ≠ postFile then
5:          print "Instance of function transferral operator detected"
6:      else
7:          continue;
8:      end if
9:  end for
```

In this situation, the step of analyzing comprises selecting a file that exists within a module in the first instance of the source code and within a module in the second instance of the source code, the first data set comprises a first set of functions associated with the selected file, wherein the first set of functions includes the functions associated with the selected file located within the module in the first instance of the source code, and the second data set comprises a second set of functions associated with the selected file, wherein the second set of functions includes the functions associated with the selected file located within the module in the second instance of the source code.

The algorithm then iterates over functions that are common to both the first and second data sets and identifies those functions whose containing file in the second data set is different from the containing file in the first data set. If the second set of functions is different from the first set of functions, the algorithm identifies an occurrence of a function transferral operation.

When detecting instances of the data structure transferral operations, the following algorithm can be used.

Algorithm 10
Identifying data structure transferral operators

```
1:  for d ∈ D do
2:      preFile = file_pre(d);
3:      postFile = file_post(d);
4:      if preFile ≠ postFile then
5:          print "Instance of data structure transferral operator detected"
6:      else
7:          continue;
8:      end if
9:  end for
```

In this situation, the step of analyzing comprises selecting a file that exists within a module in the first instance of the source code and within a module in the second instance of the source code, the first data set comprises a first set of data structures associated with the selected file, wherein the first set of data structures includes the data structures associated with the selected file located within the module in the first instance of the source code, and the second data set comprises a second set of data structures associated with the selected file, wherein the second set of data structures includes the data structures associated with the selected file located within the module in the second instance of the source code.

The algorithm then iterates over data structures that are common to both the first and second data sets and identifies those data structures whose containing file in the second data set is different from the containing file in the first data set. If the second set of data structures is different from the first set of data structures, the algorithm identifies an occurrence of a data structure transferral operation.

After an occurrence of a preventive maintenance operation is identified, the results may be reported to a consumer or other entity, such as a software developer or distributor. This reporting can occur in any known fashion, for example, through electronic means using any suitable communication medium. In this manner, the receiving entity will be able to confirm that the identified preventive maintenance operation was indeed carried out on the source code. This process has extensive value to the consumer to keep them informed of the actions being taken to keep their source code up to date, thereby preventing errors and such from occurring.

Furthermore, being able to verify that instance of preventive maintenance operations occurred can lead to the development and/or modification of pricing arrangements for the software and/or source code. Any suitable pricing model may be utilized in this regard, and any fee arrangements can include fixed, variable, or subscription based fee arrangements, as needed. Exemplary pricing models include, for example, charging a fee for each identified preventive maintenance operation, charging a fee for each line of code devoted to or impacted by the identified preventive maintenance operations, charging a flat or subscription based fee over a set period of time, and the like. For example, a consumer may be willing to pay a higher price or utilize a subscription for a software maintenance service if they can verify that preventive maintenance actions have been taken on their software, thereby keeping their system up-to-date and protected from crashes or other errors that may occur if the preventative maintenance operations had not been carried out.

Alternative Implementations

As set forth above; the methods of the invention can be implemented in systems for identifying occurrences of preventive maintenance on computer source code. Such systems preferably include computing devices configured to carry out the steps of the method. For example, an exemplary system would preferably include a computing device configured to analyze a first instance of a source code, a computing device configured to analyze a second instance of the source code, wherein the second instance of the source code is a revised version of the first instance of the source code, a computing device configured to define a first data set associated with at least one characteristic of the first instance of the source code, a computing device configured to define a second data set associated with at least one characteristic of the second instance of the source code, and a computing device configured to apply an operation algorithm to the first data set and the second data set to thereby identify at least one occurrence of a preventive maintenance operation that was carried out on the source code. The computing devices of the system can be further configured to apply the specific algorithms set forth above, and a single computing device can be configured to perform the functions of two or more of the computing devices.

The systems of the invention can include any suitable computing devices including, for example, servers, workstations, personal computers (PCs), laptop computers, PDAs, Internet appliances, set top boxes, modems, handheld devices, telephones, cellular telephones, wireless devices or other devices capable of performing the processes of the disclosed exemplary embodiments. These computing devices can preferably communicate with each other using any suitable protocol and can be implemented using a general-purpose computer system, and the like. One or more interface mechanisms can be employed on these devices including, for example, Internet access, telecommunications in any suitable form, such as voice, modem, and the like, and wireless communications media, and the like. The computing devices can also preferably utilize wireless communications networks, cellular communications networks, satellite communications networks, Public Switched Telephone Networks (PSTNs), Packet Data Networks (PDNs), the Internet, intranets, hybrid communications networks, combinations thereof, and the like.

It is to be understood that the exemplary embodiments described herein are for exemplary purposes, as many variations of the specific methods and hardware used to implement the disclosed exemplary embodiments are possible. For example, the functionality of the computing devices can be implemented via one or more programmed computer systems or devices. To implement, such variations as well as other variations, a single computer system can be programmed to perform the functions of one or more of the devices. On the other hand, two or more programmed computer systems or devices can be substituted for one or more of the devices.

The invention can also be implanted using a non-transitory computer-readable storage medium having instructions recorded thereon for identifying occurrences of preventive maintenance on computer source code, which when executed by a processor, cause the processor to carry out the steps of the method. The computer readable medium can include any suitable medium that participates in providing instructions to a processor for execution. Such a medium can take many forms including, for example, a floppy disk, a flexible disk, hard disk, magnetic tape, any other magnetic medium, a CD-ROM, CD-RW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, or any other medium from which a computer can read.

Stored on any one or on a combination of computer readable media, the exemplary embodiments of the present invention can include software for causing computing devices to carry out the steps of the method. Such software can include, but is not limited to, device drivers, firmware, operating systems, development tools, applications software, etc. Such computer readable media can further include any interpretable or executable code mechanism, including but not limited to scripts, interpretable programs, dynamic link libraries (DLLs), Java classes and applets, complete executable programs, Common Object Request Broker Architecture (CORBA) objects, etc. Moreover, parts of the processing of the embodiments of the present invention can be distributed for better performance, reliability, and/or cost.

While the present invention have been described in connection with a number of exemplary embodiments and implementations, the present invention is not so limited but rather covers various modifications and equivalent arrangements, which fall within the purview of the appended claims.

What is claimed is:

1. A method for identifying occurrences of preventive maintenance on computer source code, the method comprising:
applying, by a code management computing device, a plurality of module decomposition operators, a plurality of module union operators and a plurality of file transferal operators to a first instance of a source code to generate a second instance of the source code with improved modularity;

analyzing, by the code management computing device, the first instance of a source code and the second instance of the source code, wherein the second instance of the source code is a revised version of the first instance of the source code;

defining, by the code management computing device, a first data set associated with at least one characteristic of the first instance of the source code and a second data set associated with at least one characteristic of the second instance of the source code, wherein the defined first data set and the second data set comprises one or more application program interface (API) files;

selecting, by the code management computing device, an operation algorithm from a plurality of operation algorithms for the defined first data set and the defined second data set based on a preventative maintenance operation that is required to be identified, wherein the selected operation algorithm identifies one or more preventative maintenance operations and wherein the plurality of operation algorithms enable identification of the plurality of decomposition operators, the plurality of module union operators and the plurality of file transferal operators; and applying, by the code management computing device the selected operation algorithm from the plurality of operation algorithms to the defined first data set and the defined second data set to identify at least one occurrence of only the preventive maintenance operation that was carried out on the source code, wherein the preventive maintenance operation comprises a code refactoring operation including modifying one or more non-functional attributes of the source code without changing an external functional behavior.

2. The method of claim 1, wherein:

the analyzing comprises selecting a file that exists within a module in the first instance of the source code and within a module in the second instance of the source code;

the first data set comprises a first neighboring set of files for the selected file, the first neighboring set of files including the selected file and all other files located within the module in the first instance of the source code; and the second data set comprises a second neighboring set of files for the selected file, the second neighboring set of files including the selected file and all other files located within the module in the second instance of the source code.

3. The method of claim 2, wherein at least one of the identified occurrences of preventive maintenance operations is the module decomposition operation when the intersection of the first neighboring set of files and the second neighboring set of files is the same as the second neighboring set of files.

4. The method of claim 2, wherein at least one of the identified occurrences of preventive maintenance operations is the module union operation when the intersection of the first neighboring set of files and the second neighboring set of files is the same as the first neighboring set of files.

5. The method of claim 2, wherein at least one of the identified occurrences of preventive maintenance operations is the file transferal operation when the intersection of the first neighboring set of files and the second neighboring set of files is smaller than either the first neighboring set of files or the second neighboring set of files.

6. The method of claim 1, wherein:

the first data set comprises a first set of API files comprising the API files included in the first instance of the source code; and the second data set comprises a second set of API files comprising the API files included in the second instance of the source code.

7. The method of claim 6, wherein at least one of the identified occurrences of preventive maintenance operations is a promote function to API operation when the second set of API files includes at least one declared function that was not included in the first set of API files.

8. The method of claim 1, wherein:

the analyzing comprises selecting a file that exists within a module in the first instance of the source code and within a module in the second instance of the source code;

the first data set comprises a first set of functions associated with the selected file, wherein the first set of functions includes the functions associated with the selected file located within the module in the first instance of the source code; and the second data set comprises a second set of functions associated with the selected file, wherein the second set of functions includes the functions associated with the selected file located within the module in the second instance of the source code.

9. The method of claim 8, wherein at least one of the identified occurrences of preventive maintenance operations is a function transferal operation when the second set of functions is different from the first set of functions.

10. The method of claim 1, wherein:

the analyzing comprises selecting a file that exists within a module in the first instance of the source code and within a module in the second instance of the source code;

the first data set comprises a first set of data structures associated with the selected file, wherein the first set of data structures includes the data structures associated with the selected file located within the module in the first instance of the source code; and the second data set comprises a second set of data structures associated with the selected file, wherein the second set of data structures includes the data structures associated with the selected file located within the module in the second instance of the source code.

11. The method of claim 10, wherein at least one of the identified occurrences of preventive maintenance operations is a data structure transferal operation when the second set of data structures is different from the first set of data structures.

12. The method of claim 1, further comprising reporting at least one identified occurrence of the preventive maintenance operation that was carried out on the source code to a consumer.

13. The method of claim 1, further comprising determining a pricing model based on at least one identified occurrence of the preventive maintenance operation that was carried out on the source code.

14. A non-transitory computer-readable storage medium having instructions recorded thereon for identifying occurrences of preventive maintenance on computer source code, which when executed by a processor, cause the processor to carry out the steps to and that comprise:

apply a plurality of module decomposition operators, a plurality of module union operators and a plurality of file transferal operators to a first instance of a source code to generate a second instance of the source code with improved modularity;

analyze the first instance of a source code and the second instance of the source code, wherein the second instance of the source code is a revised version of the first instance of the source code;

define a first data set associated with at least one characteristic of the first instance of the source code and a second data set associated with at least one characteristic of the second instance of the source code, wherein the defined first data set and the second data set comprises one or more application program interface (API) files;

select an operation algorithm from a plurality of operation algorithms for the defined first data set and the defined second data set based on a preventative maintenance operation that is required to be identified, wherein the selected operation algorithm identifies one or more preventative maintenance operations and wherein the plurality of operation algorithms enable identification of the plurality of decomposition operators, the plurality of module union operators and the plurality of file transferal operators; and apply the selected operation algorithm from the plurality of operation algorithms to the defined first data set and the defined second data set to identify at least one occurrence of only the preventive maintenance operation that was carried out on the source code, wherein the preventive maintenance operation comprises a code refactoring operation including modifying one or more non-functional attributes of the source code without changing an external functional behavior.

15. The non-transitory computer-readable storage medium of claim 14, wherein:
the analyzing comprises selecting a file that exists within a module in the first instance of the source code and within a module in the second instance of the source code;
the first data set comprises a first neighboring set of files for the selected file, the first neighboring set of files including the selected file and all other files located within the module in the first instance of the source code; and
the second data set comprises a second neighboring set of files for the selected file, the second neighboring set of files including the selected file and all other files located within the module in the second instance of the source code.

16. The non-transitory computer-readable storage medium of claim 15, wherein at least one of the identified occurrences of preventive maintenance operations is the module decomposition operation when the intersection of the first neighboring set of files and the second neighboring set of files is the same as the second neighboring set of files.

17. The non-transitory computer-readable storage medium of claim 15, wherein at least one of the identified occurrences of preventive maintenance operations is the module union operation when the intersection of the first neighboring set of files and the second neighboring set of files is the same as the first neighboring set of files.

18. The non-transitory computer-readable storage medium of claim 15, wherein at least one of the identified occurrences of preventive maintenance operations is the transferal operation when the intersection of the first neighboring set of files and the second neighboring set of files is smaller than either the first neighboring set of files or the second neighboring set of files.

19. The non-transitory computer-readable storage medium of claim 14, wherein:
the first data set comprises a first set of API files comprising the API files included in the first instance of the source code; and
the second data set comprises a second set of API files comprising the API files included in the second instance of the source code.

20. The non-transitory computer-readable storage medium of claim 19, wherein at least one of the identified occurrences of preventive maintenance operations is a promote function to API operation when the second set of API files includes at least one declared function that was not included in the first set of API files.

21. The non-transitory computer-readable storage medium of claim 14, wherein:
the analyzing comprises selecting a file that exists within a module in the first instance of the source code and within a module in the second instance of the source code;
the first data set comprises a first set of functions associated with the selected file, wherein the first set of functions includes the functions associated with the selected file located within the module in the first instance of the source code; and
the second data set comprises a second set of functions associated with the selected file, wherein the second set of functions includes the functions associated with the selected file located within the module in the second instance of the source code.

22. The non-transitory computer-readable storage medium of claim 21, wherein at least one of the identified occurrences of preventive maintenance operations is a function transferal operation when the second set of functions is different from the first set of functions.

23. The non-transitory computer-readable storage medium of claim 14, wherein:
the analyzing comprises selecting a file that exists within a module in the first instance of the source code and within a module in the second instance of the source code;
the first data set comprises a first set of data structures associated with the selected file, wherein the first set of data structures includes the data structures associated with the selected file located within the module in the first instance of the source code; and
the second data set comprises a second set of data structures associated with the selected file, wherein the second set of data structures includes the data structures associated with the selected file located within the module in the second instance of the source code.

24. The non-transitory computer-readable storage medium of claim 23, wherein at least one of the identified occurrences of preventive maintenance operations is a data structure transferal operation when the second set of data structures is different from the first set of data structures.

25. The non-transitory computer-readable storage medium of claim 14, further comprising instructions for reporting at least one identified occurrence of the preventive maintenance operation that was carried out on the source code to a consumer.

26. The non-transitory computer-readable storage medium of claim 14, further comprising instructions for determining a pricing model based on at least one identified occurrence of the preventive maintenance operation that was carried out on the source code.

27. A code management computing device comprising:
one or more processors;
a memory, wherein the memory coupled to the one or more processors which are configured to execute programmed instructions stored in the memory to and that comprise:
apply a plurality of module decomposition operators, a plurality of module union operators and a plurality of file transferal operators to a first instance of a source code to generate a second instance of the source code with improved modularity;
analyze the first instance of a source code and the second instance of the source code, wherein the second instance of the source code is a revised version of the first instance of the source code;
define a first data set associated with at least one characteristic of the first instance of the source code and a second data set associated with at least one characteristic of the second instance of the source code, wherein the defined first data set and the second data set comprises one or more application program interface (API) files;
select an operation algorithm from a plurality of operation algorithms for the defined first data set and the defined second data set based on a preventative maintenance operation that is required to be identified, wherein the selected operation algorithm identifies one or more preventative maintenance operations and wherein the plurality of operation algorithms enable identification of the plurality of decomposition operators, the plurality of module union operators and the plurality of file transferal operators; and
apply the selected operation algorithm from the plurality of operation algorithms to the defined first data set and the defined second data set to identify at least one occurrence of only the preventive maintenance operation that was carried out on the source code, wherein the preventive maintenance operation comprises a code refactoring operation including modifying one or more non-functional attributes of the source code without changing an external functional behavior.

28. The device as set forth in claim 27 wherein the one or more processors is further configured to execute programmed instructions stored in the memory wherein:
the analyzing comprises selecting a file that exists within a module in the first instance of the source code and within a module in the second instance of the source code;
the first data set comprises a first neighboring set of files for the selected file, the first neighboring set of files including the selected file and all other files located within the module in the first instance of the source code; and
the second data set comprises a second neighboring set of files for the selected file, the second neighboring set of files including the selected file and all other files located within the module in the second instance of the source code.

29. The device as set forth in claim 28 wherein at least one of the identified occurrences of preventive maintenance operations is the module decomposition operation when the intersection of the first neighboring set of files and the second neighboring set of files is the same as the second neighboring set of files.

30. The device as set forth in claim 28 wherein at least one of the identified occurrences of preventive maintenance operations is the module union operation when the intersection of the first neighboring set of files and the second neighboring set of files is the same as the first neighboring set of files.

31. The device as set forth in claim 28 wherein at least one of the identified occurrences of preventive maintenance operations is the file transferal operation when the intersection of the first neighboring set of files and the second neighboring set of files is smaller than either the first neighboring set of files or the second neighboring set of files.

32. The device as set forth in claim 27 wherein:
the analyzing comprises selecting a file that exists within a module in the first instance of the source code and within a module in the second instance of the source code;
the first data set comprises a first set of data structures associated with the selected file, wherein the first set of data structures includes the data structures associated with the selected file located within the module in the first instance of the source code; and
the second data set comprises a second set of data structures associated with the selected file, wherein the second set of data structures includes the data structures associated with the selected file located within the module in the second instance of the source code.

33. The device as set forth in claim 32 wherein at least one of the identified occurrences of preventive maintenance operations is a promote function to API operation when a second set of API files includes at least one declared function that was not included in a first set of API files.

34. The device as set forth in claim 33 wherein at least one of the identified occurrences of preventive maintenance operations is a data structure transferal operation when the second set of data structures is different from the first set of data structures.

35. The device as set forth in claim 27 wherein the one or more processors is further configured to execute programmed instructions stored in the memory further comprising reporting at least one identified occurrence of the preventive maintenance operation that was carried out on the source code to a consumer.

36. The device as set forth in claim 27 wherein the one or more processors is further configured to execute programmed instructions stored in the memory further comprising determining a pricing model based on at least one identified occurrence of the preventive maintenance operation that was carried out on the source code.

* * * * *